UNITED STATES PATENT OFFICE.

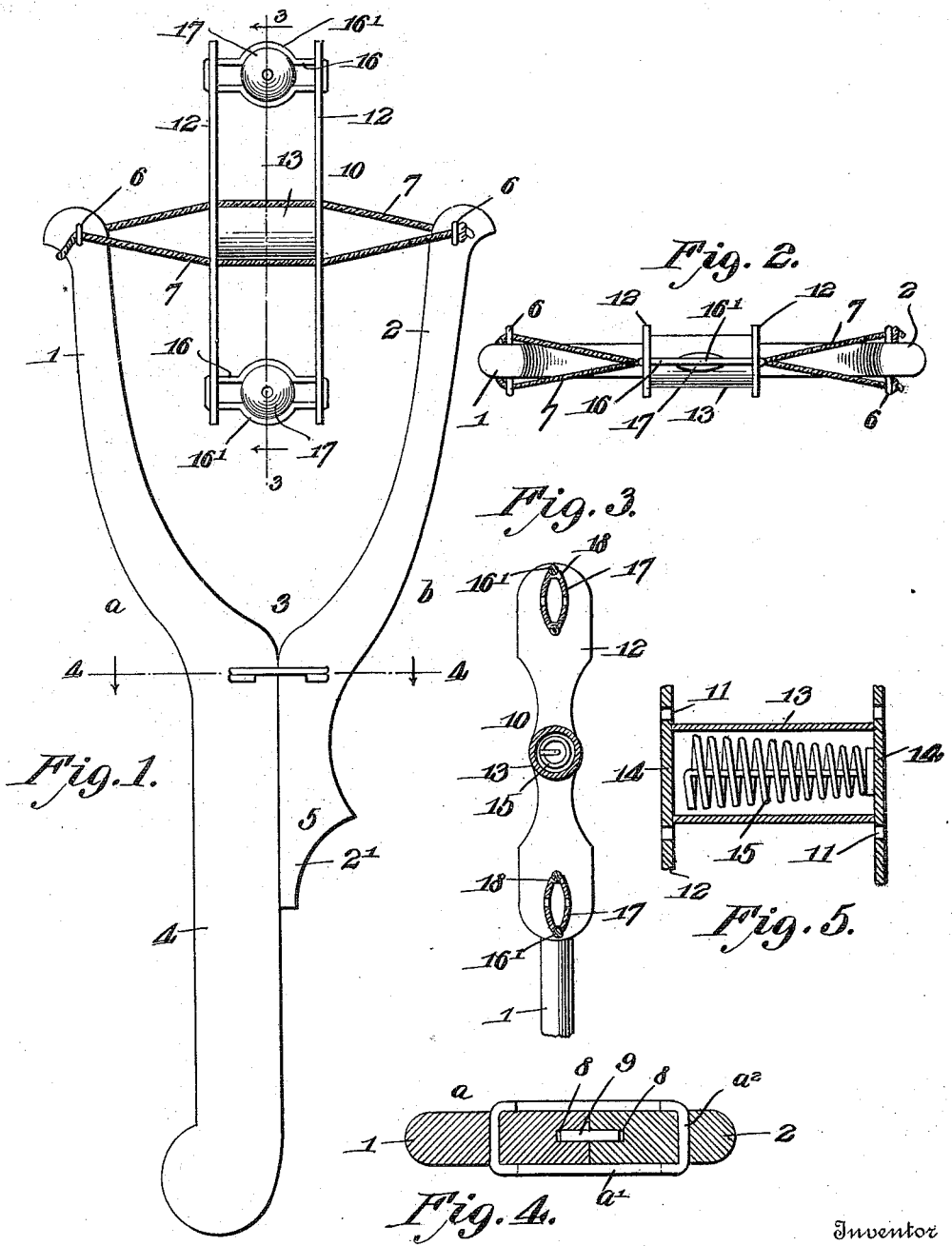

ARTHUR COASKE, OF MEMPHIS, TENNESSEE.

TOY.

983,207.   Specification of Letters Patent.   Patented Jan. 31, 1911.

Application filed January 11, 1910. Serial No. 537,422.

*To all whom it may concern:*

Be it known that I, ARTHUR COASKE, a citizen of the United States, residing at Memphis, in the county of Shelby and State of Tennessee, have invented new and useful Improvements in Toys, of which the following is a specification.

This invention relates to toys, and more especially to those which emit sound; and the object of the same is to produce a whirligig which in action will emit an almost constant whistle and an occasional chime.

To this end the invention consists in forming the body of the whirligig in the shape of a drum and securing the chime at one end to and within one end of the drum so that the free end of the chime may strike the drum on occasions, and in mounting parallel strips across the ends of the drum and arranging whistles between their extremities and with the inlet openings in the line of rotation.

The invention also consists in further details, all of which will be described and shown in the drawings, wherein—

Figure 1 is an elevation of a device constructed in accordance with my invention. Fig. 2 is a top plan view of the toy. Fig. 3 is a section on line 3—3 of Fig. 1. Fig. 4 is a section on the line 4—4 of Fig. 1, and Fig. 5 is a longitudinal sectional view through the drum of the whirling part of the toy, the side members being broken away.

Referring more particularly to the drawing, the invention comprises the members $a$ and $b$, pivoted at 3, the member $a$ of which extends below the pivot 3 and forms the handle 4. The member $b$ extends a short distance below the pivot 3 and is tapered at 5 to form a recess $2'$ for the reception of the thumb. The members $a$ and $b$ diverge above the pivot 3 forming the arms 1 and 2 and have secured near their upper ends the eyes 6 to which is secured the cord 7. The pivot in a loop which as here shown comprises a pair of U-shaped wire staples $a^1$ whose arms $a^2$ are driven through the members $a$ and $b$ at their juncture, and clenched on the opposite sides as best seen in Fig. 4. In the contacting faces of the juncture of the members $a$ and $b$ are formed the oppositely arranged recesses 8, adapted to receive the pin 9, which pin serves to prevent the members riding up or down and getting out of alinement.

A whirligig 10 is mounted on the twin cords 7 by means of perforations 11 formed in the parallel side strips 12. On the axis of the whirligig and about midway of the length of said strips there is secured between them a drum 13 to one end 14 to which is attached one extremity of the spiral spring or chime 15 whose other and larger end is free within the drum but normally out of contact with it; and when the whirligig rotates said free extremity occasionally strikes within the drum and sounds a chime. Between the outer ends of each pair of side strips 12 are the spaced braces 16, between which are secured the whistles 17. These whistles 17 may be secured in any suitable manner to the braces 16 as by a drop of solder, or the whistles may be provided with the grooves 18 shown in Fig. 3, and the braces 16 bent at $16^1$ as seen in Fig. 1 to lie in the grooves.

To operate the device the handle 4 is grasped in the hand with the thumb engaging the recess $2^1$ of the member $b$. By turning the whirligig 10 slightly so as to partly twist the cord 7, and by properly opening and releasing the handles the whirligig 10 will wind and unwind the string or cord 7. The rapid whirling of the whirligig 10 will cause air to be forced through the whistles 17 and emit a whistling or screeching sound, and this is facilitated by the fact that the openings of the whistles stand in the line of their rotation. On occasions the free end of the spring 15 strikes against the drum and emits a chime, and as the spring resumes its position best seen in Fig. 5 the musical sound produced thereby continues. Thus it will appear that in the use of the toy the whistles screech almost constantly and the chime occurs at intervals, much to the amusement of the operator.

Having thus fully described the invention, what is claimed is:—

In a sounding toy, the combination with a pair of members pivotally connected and having diverging arms, and twin cords connecting the arms; of a whirligig comprising a drum and parallel strips secured across its ends and having perforations through which said cords pass, a coiled spring secured at one extremity within one end of the drum and having its other extremity free therein and normally out of contact therewith, and whistles supported between the outer ends of said strips with their inlets disposed in the line of rotation of the whirligig.

In testimony whereof I affix my signature in presence of two witnesses.

ARTHUR COASKE.

Witnesses:
R. L. MATTHEWS,
CLAUDE MCBRIDE.